Nov. 17, 1936.  L. A. LILLY  2,061,283
TIRE LUG FOR TRACTORS
Filed March 11, 1935
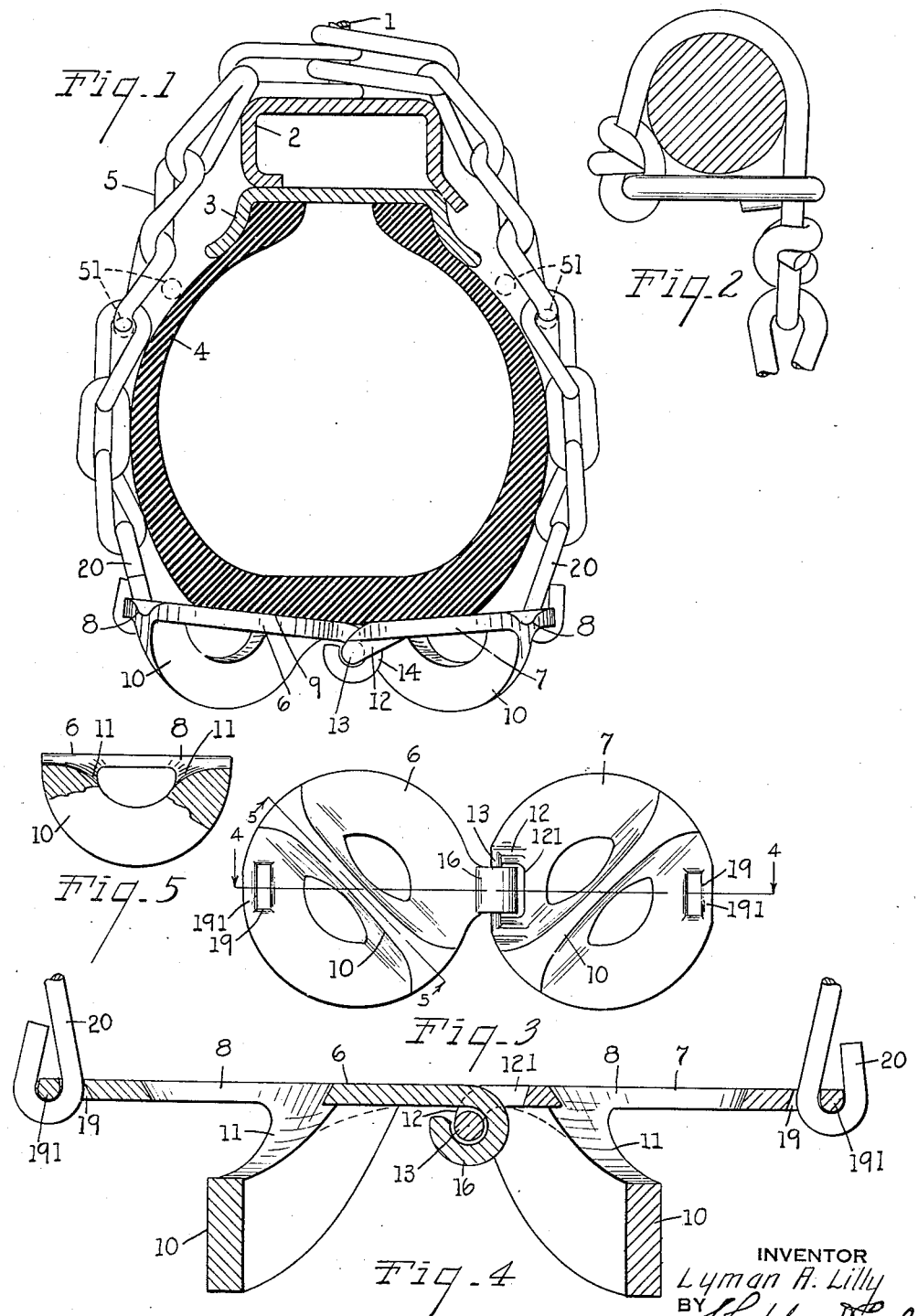
INVENTOR
Lyman A. Lilly
BY Chappell & Earl
ATTORNEYS Patented Nov. 17, 1936

2,061,283

UNITED STATES PATENT OFFICE 2,061,283

TIRE LUG FOR TRACTORS

Lyman A. Lilly, Plainwell, Mich.

Application March 11, 1935, Serial No. 10,399

1 Claim. (Cl. 152—14)

The main objects of this invention are:

First, to provide an improved lug attachment for pneumatic tractor tires especially.

Second, to provide as a lug member a pair of circular disk-like hingedly connected traction plates each provided with an outer projecting engaging lug of semi-circular form, said plates being connected by integral hinge members.

Third, to provide a traction lug means for tires which will obviate capsizing of without interfering with the normal function of the device.

Fourth, to provide effective cooperating lug means for large size tractor tires.

Objects relating to details and economies of my invention will appear from the description to follow. A structure which is a preferred embodiment of my invention is illustrated in the accompanying drawing, in which:

Fig. 1 is a fragmentary cross section of a wire spoked tractor wheel having associated therewith one of my lug members with attaching chain embodying the features of my invention, showing the relation as weight is partially applied and the tire partially depressed.

Fig. 2 is a fragmentary section through the spoke of a wood spoked wheel having associated therewith a modified form of my invention for connecting the cross chain to the wood spoke.

Fig. 3 is a fragmentary bottom plan view of one of my lug members with the attaching side chains omitted.

Fig. 4 is an enlarged fragmentary sectional view of one of my lug members on a line corresponding to line 4—4 of Fig. 3, showing the relation of the parts assembled.

Fig. 5 is an elevation view partly in section on line 5—5 of Fig. 3 showing one of the disks of my lug member.

The parts will be identified by their numerals of reference which are the same throughout the several views.

1 is a spoke, 2 the felly, 3 the rim, and 4 the balloon tire of a conventional wire spoked tractor wheel. 5 is the cross chain attaching means in general.

My improved tire lug means comprises a pair 6 and 7 of disk-like traction plates each having a concaved inner surface 8 for coaction with the tire tread 9 and a diagonal outer semi-circular engaging lug 10 with curved engaging surface 11.

The plate 7 has an inner integral hinge member 12 consisting of the cross bar 13, all formed within the periphery of the disk base by slot 121.

The plate 6 has an inner integral hook-like hinge member 16 constituting a bearing for the cross bar 13. The structure being a steel casting, this is closed on to bar 13 by bending as by a blow of a sledge.

Each of the traction plates 6 and 7 has an outer slot 19 within the periphery of the disk to form pivot bars 191. Chain links 20 of any usual form are associated with each of such outer hinge slot members by being hooked through the slot 19 as seen in detail in Figs. 3 and 4.

In Figs. 1 and 4, I show simple cross chains 5 for attaching my improved lug member in place by engagement with either the wire spoke as seen in Fig. 1, or with the wood spoke of such a wheel as seen in Fig. 2. I show in dotted lines 51 in Fig. 1 the position that side chains would occupy for attachment of cross chains 5, such side chains being of any usual form and being used in the event of disk wheels or wheels where such side chains would be preferred.

In Fig. 5, I show in detail the form of the convexity at the center of the disk parts 6 and 7. These permit the tire tread to expand and form an engagement with the base of each disk that permits it to become well seated in the tread of the tire and thereby prevent capsizing when power is turned on to drive the tractor with force.

It will be remembered that these tractors in plowing hardly ever pull less than two plows and often a large gang. Engagement with the soft ground is therefore of the highest importance and the tendency to prevent capsizing is of very high consequence to keep the lug member to its work. The tires are sometimes run with as low as ten pounds pressure, which makes the broad surface and certain engagement of extra consequence. Of course, the whole structure is sunk into the comparatively soft soil which is being plowed or otherwise cultivated and consequently the broad semi-circular parts engaging the comparatively soft ground assist in maintaining the position by their coaction with their broad circular bases. In extra heavy work it is necessary to inflate the tires sufficiently to insure the maintenance of the lug members in position. By producing the structures with the hinge members, and attachments within the periphery of the disks, I have secured a maximum size of the disk, consequently a maximum size of the lug member and the consequent increase in efficiency. The disks for ordinary service on nine to eleven inch tires are five inches in diameter. Of course, when the tractor is transported over the highway these lugs are ordinarily removed because they are prohibited by highway law.

In this behalf I desire to disclaim lugs of rubber or such as are formed on the tires themselves but restrict my claim to what might be determined the detachable tractor lugs for use on pneumatic tires. This present application is a continuation in part of my former application filed Nov. 18, 1933, Ser. No. 698,557.

Having thus described my invention, what I claim as new and desire to secure by Letters Patent is:

The combination with a pneumatic tractor tire of a lug structure comprising a pair of circular base plates concaved at their inner surface to correspond with the bulging portion of said pneumatic tire and become in effect a part of the tread thereof, the said plates hinged together at their peripheries by integral hinge formation consisting of a slot formed within the periphery of one of the associated disks and a tongue formed on the opposite plate and bent into an eye to form a hinge therebetween, opposed lugs on said plates of semi-circular form having a thin penetrating central part, the diameter of which is integral with said base plate and disposed to engage in diagonal lines that converge toward the direction of travel of the wheel on which the said tire is mounted, and means for retaining the said tractor lugs on the periphery of the tire so that the lugs engage the ground by the penetration of said semi-circular lugs by their rolling action, whereby the ground is penetrated and engaged by the lugs with a minimum of vibration and the maximum of traction.

LYMAN A. LILLY.